United States Patent
Linge et al.

(10) Patent No.: US 11,265,145 B2
(45) Date of Patent: *Mar. 1, 2022

(54) METHOD AND DEVICE FOR PERFORMING SUBSTITUTION TABLE OPERATIONS

(71) Applicant: STMICROELECTRONICS (ROUSSET) SAS, Rousset (FR)

(72) Inventors: Yanis Linge, Fuveau (FR); Thomas Ordas, Pourcieux (FR); Pierre-Yvan Liardet, Lotissement l'Audiguier (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 409 days.

This patent is subject to a terminal disclaimer.

(21) Appl. No.: 16/281,881

(22) Filed: Feb. 21, 2019

(65) Prior Publication Data
US 2019/0268137 A1 Aug. 29, 2019

(30) Foreign Application Priority Data
Feb. 26, 2018 (FR) .................................. 1851638

(51) Int. Cl.
*H04L 9/06* (2006.01)
*H04L 9/00* (2022.01)

(52) U.S. Cl.
CPC ............ *H04L 9/0631* (2013.01); *H04L 9/003* (2013.01); *H04L 2209/043* (2013.01); *H04L 2209/08* (2013.01)

(58) Field of Classification Search
CPC . H04L 9/0631; H04L 9/003; H04L 2209/043; H04L 2209/08
See application file for complete search history.

(56) References Cited

U.S. PATENT DOCUMENTS 6,591,415 B1 * 7/2003 Torrubia-Saez ........ G06F 21/10
717/158
9,906,360 B2 * 2/2018 Johnson ................ H04L 9/0631
(Continued)

FOREIGN PATENT DOCUMENTS

CN 104378196 A 2/2015
CN 104734842 A 6/2015
(Continued)

OTHER PUBLICATIONS

Pan et al., "You Cannot Hide behind the Mask: Power Analysis on a Provably Secure S-Box Implementation," Information Security Applications: 10th International Workshop, Busan, South Korea, Aug. 25-27, 2009, pp. 178-192.
(Continued)

*Primary Examiner* — David Garcia Cervetti
(74) *Attorney, Agent, or Firm* — Seed IP Law Group LLP (57) ABSTRACT

The disclosure concerns implementing, by a cryptographic circuit, a set of substitution operations of a cryptographic process involving a plurality of substitution tables. For each set of substitution operations of the cryptographic process, a series of sets of substitution operations are performed. One set of the series is a real set of substitution operations corresponding to the set of substitution operations of the cryptographic process. One or more other sets are dummy sets of substitution operations, each dummy set being based on a different permutation of said substitution tables.

24 Claims, 5 Drawing Sheets

(56) References Cited

U.S. PATENT DOCUMENTS

| | | | |
|---|---|---|---|
| 10,243,728 B2* | 3/2019 | Bruneau | H04L 9/0631 |
| 2003/0190155 A1* | 10/2003 | Tsutsui | G11B 20/00086 |
| | | | 386/268 |
| 2003/0190156 A1 | 10/2003 | Arai et al. | |
| 2003/0223580 A1* | 12/2003 | Snell | H04L 9/0631 |
| | | | 380/28 |
| 2004/0019389 A1 | 1/2004 | Swords | |
| 2004/0193898 A1* | 9/2004 | Ochi | H04L 9/003 |
| | | | 713/189 |
| 2007/0026385 A1 | 2/2007 | Rasenick et al. | |
| 2007/0263859 A1* | 11/2007 | Teglia | H04L 9/003 |
| | | | 380/29 |
| 2008/0019503 A1* | 1/2008 | Dupaquis | H04L 9/002 |
| | | | 380/28 |
| 2009/0005545 A1 | 1/2009 | Valliant et al. | |
| 2009/0008697 A1 | 1/2009 | Forbes | |
| 2009/0011321 A1 | 1/2009 | Kan et al. | |
| 2009/0055458 A1* | 2/2009 | O'Neil | H04L 9/0618 |
| | | | 708/400 |
| 2009/0074181 A1 | 3/2009 | Pelletier | |
| 2009/0086976 A1* | 4/2009 | Scian | H04L 9/003 |
| | | | 380/277 |
| 2009/0113217 A1* | 4/2009 | Dolgunov | H04L 9/0894 |
| | | | 713/190 |
| 2009/0158051 A1* | 6/2009 | Michiels | H04L 9/002 |
| | | | 713/189 |
| 2011/0296198 A1 | 12/2011 | Motoyama | |
| 2013/0064362 A1* | 3/2013 | Tang | H04L 9/16 |
| | | | 380/29 |
| 2014/0018720 A1 | 1/2014 | Horvath et al. | |
| 2014/0187202 A1* | 7/2014 | Buck | H04W 12/08 |
| | | | 455/411 |
| 2014/0351603 A1 | 11/2014 | Feix et al. | |
| 2015/0270950 A1* | 9/2015 | Michiels | H04L 9/002 |
| | | | 380/28 |
| 2015/0286524 A1* | 10/2015 | Trantham | G06F 11/108 |
| | | | 714/766 |
| 2016/0065361 A1* | 3/2016 | Choi | H04L 9/0631 |
| | | | 380/287 |
| 2016/0182227 A1* | 6/2016 | Michiels | H04L 9/06 |
| | | | 380/28 |
| 2016/0261405 A1* | 9/2016 | Chevallier-Mames | |
| | | | H04L 9/0631 |
| 2016/0269175 A1* | 9/2016 | Cammarota | H04L 9/002 |
| 2016/0277180 A1* | 9/2016 | Wang | G09C 1/00 |
| 2016/0350520 A1* | 12/2016 | Michiels | G06F 21/72 |
| 2017/0244551 A1* | 8/2017 | Thiebeauld De La Crouee | |
| | | | H04L 9/3247 |
| 2017/0244552 A1* | 8/2017 | Thiebeauld De La Crouee | |
| | | | G09C 1/00 |
| 2017/0373838 A1* | 12/2017 | Wurcker | H04L 9/0631 |
| 2018/0331820 A1* | 11/2018 | Rietman | H01L 23/5383 |
| 2018/0351743 A1* | 12/2018 | Michiels | H04L 9/002 |
| 2019/0057228 A1* | 2/2019 | Feix | G09C 1/00 |
| 2019/0116022 A1* | 4/2019 | Kim | G01N 33/56972 |
| 2020/0004992 A1* | 1/2020 | Chong | H04L 9/003 |
| 2020/0092081 A1* | 3/2020 | Rietman | H04L 9/002 |
| 2020/0125333 A1* | 4/2020 | Vigilant | H04L 9/0631 |
| 2020/0177365 A1* | 6/2020 | De Hoogh | H04L 9/0631 |
| 2020/0177366 A1 | 6/2020 | Han et al. | |
| 2020/0322127 A1* | 10/2020 | Lozac'h | H04L 9/003 |
| 2021/0058228 A1* | 2/2021 | Cioranesco | H04L 9/003 |

FOREIGN PATENT DOCUMENTS

| | | | | |
|---|---|---|---|---|
| CN | 104734845 A | 6/2015 | | |
| CN | 107980212 A | 5/2018 | | |
| EP | 3 188 000 | 7/2017 | | |
| EP | 3188000 A1 * | 7/2017 | | G06F 7/723 |
| FR | 2 985 624 A1 | 7/2019 | | |
| KR | 20210058228 A * | 5/2021 | | |

OTHER PUBLICATIONS

Yang et al., "Design Research of the DES against power analysis attacks based on FPGA," *Microprocessors and Microsystems* 35:18-22, 2011.

U.S. Appl. No. 16/281,887, filed Feb. 21, 2019, Method and Circuit for Implementing a Substitution Table.

U.S. Appl. No. 16/281,889, filed Feb. 21, 2019, Method and Circuit for Performing a Substitution Operation.

* cited by examiner

METHOD AND DEVICE FOR PERFORMING SUBSTITUTION TABLE OPERATIONS

BACKGROUND

Technical Field

The present disclosure relates to the field of electronic circuits, and in particular to a device and method for accessing substitution tables during a cryptographic operation.

Description of the Related Art

Substitution tables, also known as S-boxes, define a data substitution operation performed during cryptographic algorithms or processes. The purpose of this data substitution is to obscure the relationship between the secret key and the cipher-text, and thus render it harder for the secret key to be discovered.

One technique used by hackers wishing to recover the secret key processed by a cryptographic device is to monitor signals on side channels in order to extract certain information relating, for example, to the power consumption or the timing in the device during the execution of a cryptographic algorithm or process. The manipulation of the secret key during substitution operations is often targeted by hackers using side channel methods due to the relative visibility of substitution operations.

Some solutions have been proposed providing a limited degree of protection against the use of side channel methods.

BRIEF SUMMARY

In an embodiment, a method comprises: executing, using a cryptographic circuit, a set of substitution operations of a cryptographic process involving a plurality of substitution tables, the executing including: performing, for each set of substitution operations of the cryptographic process, a series of sets of substitution operations of which: one set of the series is a real set of substitution operations corresponding to the set of substitution operations of the cryptographic process; and one or more other sets of the series are dummy sets of substitution operations, each dummy set being based on a different permutation of said substitution tables. In an embodiment, a position of the real set of substitution operations in each series is selected randomly based on a first random value. In an embodiment, performing each series of sets of substitution operations comprises: loading N input values, where N is an integer equal to or greater than two; and supplying, on consecutive sets of S-box access operations, each of said N input values to a respective one of N S-boxes, wherein during the real set of substitution operations each of the N input values is supplied to a corresponding one of said N S-boxes based on said cryptographic process, and during the dummy sets of substitution operations each of the N input values is supplied to a different S-box than its corresponding S-box, and wherein the position that the real set of substitution operations is performed with respect to the dummy sets of substitution operations is selected based on the first random value. In an embodiment, each set of substitution operations comprises addressing memory locations of one or more memories based on S-box input data values and reading values at said memory locations to provide S-box output data values. In an embodiment, the method comprises, for each series of sets of substitution operations, storing the S-box output values of each substitution operation, and selecting the output values corresponding to said real set of substitution operations based on said first random value. In an embodiment, performing each set of substitution operations in said series comprises using a same input message and secret key. In an embodiment, each series of sets of substitution operations comprises m−1 dummy sets of substitution operations, where m is an integer fixed at a value equal to or greater than 2 or selected randomly; and for a given key, a same group of m−1 permutations are applied during the corresponding m−1 dummy substitution operations. In an embodiment, each group of m−1 permutations for a given key is selected based on a second random value. In an embodiment, a number of dummy sets of substitution operations performed in each series is selected randomly.

In an embodiment, a non-transitory computer-readable medium stores a computer program which, when executed by a processing device, implements a method, the method comprising: executing a set of substitution operations of a cryptographic process involving a plurality of substitution tables, the executing including: performing, for each set of substitution operations of the cryptographic process, a series of sets of substitution operations of which: one set of the series is a real set of substitution operations corresponding to the set of substitution operations of the cryptographic process; and one or more other sets of the series are dummy sets of substitution operations, each dummy set being based on a different permutation of said substitution tables. In an embodiment, a position of the real set of substitution operations in each series is selected randomly based on a first random value. In an embodiment, performing each series of sets of substitution operations comprises: loading N input values, where N is an integer equal to or greater than two; and supplying, on consecutive sets of S-box access operations, each of said N input values to a respective one of N S-boxes, wherein during the real set of substitution operations each of the N input values is supplied to a corresponding one of said N S-boxes based on said cryptographic process, and during the dummy sets of substitution operations each of the N input values is supplied to a different S-box than its corresponding S-box, and wherein the position that the real set of substitution operations is performed with respect to the dummy sets of substitution operations is selected based on the first random value. In an embodiment, each series of sets of substitution operations comprises m−1 dummy sets of substitution operations, where m is an integer fixed at a value equal to or greater than 2 or selected randomly; and for a given key, a same group of m−1 permutations are applied during the corresponding m−1 dummy substitution operations. In an embodiment, each group of m−1 permutations for a given key is selected based on a second random value. In an embodiment, a number of dummy sets of substitution operations performed in each series is selected randomly.

In an embodiment, a cryptographic device comprises: a memory circuit, which, in operation, stores a plurality of substitution tables to implement sets of substitution operations of a cryptographic process; and one or more circuits, which, in operation, execute the cryptographic process, the executing the cryptographic process including, for each set of substitution operations of the cryptographic process, performing a series of sets of substitution operations using said substitution tables, each series of sets of substitution operations comprising: a real set of substitution operations corresponding to the set of substitution operations of the cryptographic process; and one or more dummy sets of substitution operations, wherein the one or more circuits apply a different permutation of said substitution tables during each of said dummy sets of substitution operations. In an embodiment, the device comprises a random number generator, which, in operation, generates, for each of said series of sets of substitution operations, a first random value, wherein the one or more circuits randomly select a position of the real set of substitution operations among the one or more dummy sets of substitution operations based on the first random value. In an embodiment, the random number generator, in operation, generates a second random value, wherein the one or more circuits randomly select the permutations of said substitution tables based on the second random value. In an embodiment, the cryptographic device comprises: an input register configured to store N input values; and one or more multiplexers configured to select, for each set of substitution operations of each series, the input value among said N input values to be provided to each substitution table. In an embodiment, the cryptographic device comprises a selection circuit configured to generate a selection signal for controlling the one or multiplexers based on said first and second random values. In an embodiment, the one or more circuits comprise one or more processing devices under control of instructions stored in an instruction memory to load N input values into a memory, where N is equal to the number of substitution tables, and to select, for each set of substitution operations of each series, either to implement the real set of substitution operations by providing each input value to a corresponding one of said substitution tables based on said cryptographic process, or to implement a dummy set of substitution operations by providing each input value to one of said substitution tables other than the corresponding one.

In an embodiment, a system comprises: one or more processing cores; and cryptographic circuitry coupled to the one or more processing cores, wherein the cryptographic circuitry, in operation, protects execution of a cryptographic process which uses a plurality of substitution tables, the protecting including: performing, for each set of substitution operations of the cryptographic process, a series of sets of substitution operations of which: one set of the series is a real set of substitution operations corresponding to the set of substitution operations of the cryptographic process; and one or more other sets of the series are dummy sets of substitution operations, each dummy set being based on a different permutation of said substitution tables. In an embodiment, a position of the real set of substitution operations in each series is selected randomly based on a first random value. In an embodiment, the cryptographic process is related to a function of the one or more processing cores.

In an embodiment, there is provided a method of implementing, by a cryptographic circuit, a set of substitution operations of a cryptographic algorithm involving a plurality of substitution tables, the method comprising: performing, for each set of substitution operations of the cryptographic algorithm, a series of sets of substitution operations of which: one set is a real set of substitution operations corresponding to the set of substitution operations of the cryptographic algorithm; and one or more other sets are dummy sets of substitution operations, each dummy set being based on a different permutation of said substitution tables.

According to one embodiment, the position of the real set of substitution operations in each series is selected randomly based on a first random value.

According to one embodiment, performing each series of sets of substitution operations comprises: loading N input values, where N is an integer equal to or greater than two; and supplying, on consecutive sets of S-box access operations, each of said N input values to a respective one of N S-boxes, during the real set of substitution operations each of the N input values being supplied to a corresponding one of the N S-boxes based on the cryptographic algorithm, and during the dummy sets of substitution operations each of the N input values being supplied to a different S-box than its corresponding S-box, and the position that the real set of substitution operations is performed with respect to the dummy sets of substitution operations being selected based on the first random value.

According to one embodiment, each set of substitution operations comprises addressing memory locations of one or more memories based on S-box input data values and reading values at the memory locations to provide S-box output data values.

According to one embodiment, the method comprises, for each series of sets of substitution operations, storing the S-box output values of each substitution operation, and selecting the output values corresponding to the real set of substitution operations based on the first random value.

According to one embodiment, performing each set of substitution operations in the series comprises executing the cryptographic algorithm based on a same input message and secret key.

According to one embodiment, each series of sets of substitution operations comprises m−1 dummy sets of substitution operations, where m is an integer fixed at a value equal to or greater than 2 or selected randomly; and for a given key, a same group of m−1 permutations are applied during the corresponding m−1 dummy substitution operations.

According to one embodiment, each group of m−1 permutations for a given key is selected based on a second random value.

According to one embodiment, the number of dummy sets of substitution operations performed in each series is selected randomly.

According to a further aspect, there is provided a non-transitory storage medium storing a computer program configured, when executed by a processing device, to implement the above method.

In an embodiment, there is provided a cryptographic circuit comprising: a memory circuit storing a plurality of substitution tables for implementing sets of substitution operations of a cryptographic algorithm; and one or more circuits configured to perform, for each set of substitution operations of the cryptographic algorithm, a series of sets of substitution operations using said substitution tables, each series of sets of substitution operations comprising: a real set of substitution operations corresponding to the set of substitution operations of the cryptographic algorithm; and one or more dummy sets of substitution operations, the one or more circuits being configured to apply a different permutation of the substitution tables during each of the dummy sets of substitution operations.

According to one embodiment, the cryptographic device further comprising a random number generator configured to generate, for each of the series of sets of substitution operations, a first random value, the one or more circuits being configured to randomly select the position of the real set of substitution operations among the one or more dummy sets of substitution operations based on the first random value.

According to one embodiment, the random number generator is further configured to generate a second random value, the one or more circuits being configured to randomly select the permutations of the substitution tables based on the second random value.

According to one embodiment, the cryptographic device further comprises: an input register configured to store N input values; and one or more multiplexers configured to select, for each set of substitution operations of each series, the input value among the N input values to be provided to each substitution table.

According to one embodiment, the cryptographic device further comprises a selection circuit configured to generate a selection signal for controlling the one or more multiplexers based on the first and second random values.

According to one embodiment, the one or more circuits comprise one or more processing devices under control of instructions stored in an instruction memory to load N input values into a memory, where N is equal to the number of substitution tables, and to select, for each set of substitution operations of each series, either to implement the real set of substitution operations by providing each input value to a corresponding one of said substitution tables based on the cryptographic algorithm, or to implement a dummy set of substitution operations by providing each input value to one of the substitution tables other than the corresponding one.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Throughout the present disclosure, the term "connected" is used to designate a direct electrical connection between circuit elements, whereas the term "coupled" is used to designate an electrical connection between circuit elements that may be direct, or may be via one or more intermediate elements such as multiplexers, buffers, etc.

Furthermore, throughout the present disclosure, the following terms will be considered to have the following definitions:

"cryptographic algorithm or process"—any series of operations performed by a device that involves the manipulation of a secret value, such as a secret key, which is to be hidden from the world outside the device. Examples of cryptographic algorithms include algorithms for encrypting or decrypting plaintext/cipher-text based on a secret key, for generating a message authentication code (MAC) or other form of digital signature based on a secret algorithm and/or key, or any other type of secretive operation;

"substitution operation" or "S-box access"—an operation of a cryptographic algorithm in which an output data value is generated based on an input data value using a substitution table, e.g., an S-box. The input and output values may have the same, or a different, number of bits. This operation is for example performed using a lookup table (LUT) stored in a memory, and the values defined in the lookup table may be fixed, or could be updated dynamically;

"set of substitution operations" or "set of S-box accesses"—a plurality of substitution operations performed using a plurality of substitution tables defined by a cryptographic algorithm. As will be described in more detail below, each set may correspond to a single access to each S-box, or to multiple accesses to each S-box. For example, a set of substitution operations may correspond to a single access to each of the eight S-boxes S1 to S8 during the execution of each substitution operation of a round of the DES algorithm. Alternatively, a set of substitution operations may correspond to all of the substitution operations performed during the execution of the DES algorithm, which involves multiple rounds;

"real set substitution operations"—a set of substitution operations defined by the cryptographic algorithm that is being executed, which is for example a useful operation in that the results of the set of substitutions will contribute towards the calculation of the useful output data of the cryptographic algorithm; and "dummy set of substitution operations"—a fake or false set of substitution operations performed in a similar manner to a real set of substitution operations, but which is superfluous as it is performed in addition to the real set of substitution operations defined by the cryptographic algorithm. While the results of each dummy set of substitution operations may be stored to memory, they are not useful in that the results serves no purpose in relation with the cryptographic algorithm and can be discarded. As described herein, the sets of dummy substitution operations are for example performed based on permutated input data provided to a plurality of substitution tables.

Figure 1:
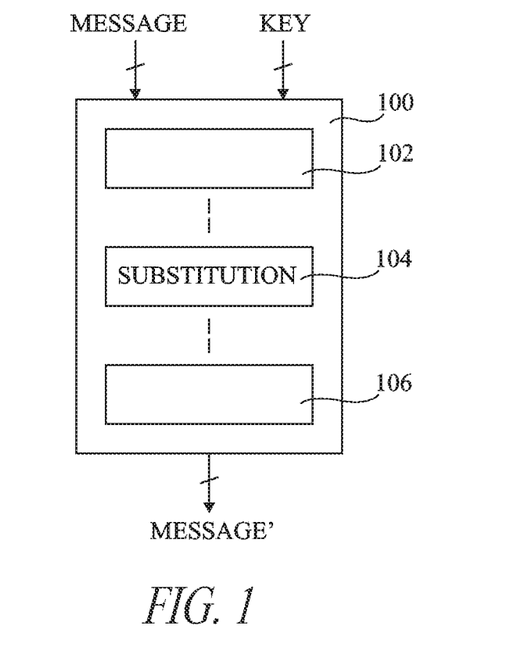
FIG. 1 schematically illustrates a circuit for executing a cryptographic algorithm involving substitution operations according to an example embodiment.

FIG. 1 schematically illustrates a cryptographic circuit 100 according to an example embodiment. The circuit 100 for example receives as inputs a message (MESSAGE) to be processed and a secret key (KEY). For example, the message corresponds to plaintext to be encrypted by the circuit 100 using the secret key, to cipher-text to be decrypted by the circuit 100 using the secret key, or to data that is to be signed by the circuit 100 by generating a digital signature, such as a MAC (message authentication code) based on the key.

The circuit 100 comprises a series of hardware modules implementing the cryptographic algorithm involving various operations 102, 104, 106 applied to the message and key in order to generate an output message (MESSAGE') corresponding to cipher-text, plaintext and/or a digital signature. In the example of FIG. 1, the operation 104 corresponds to a substitution operation (SUBSTITUTION) involving a plurality of substitution tables.

Figure 2:
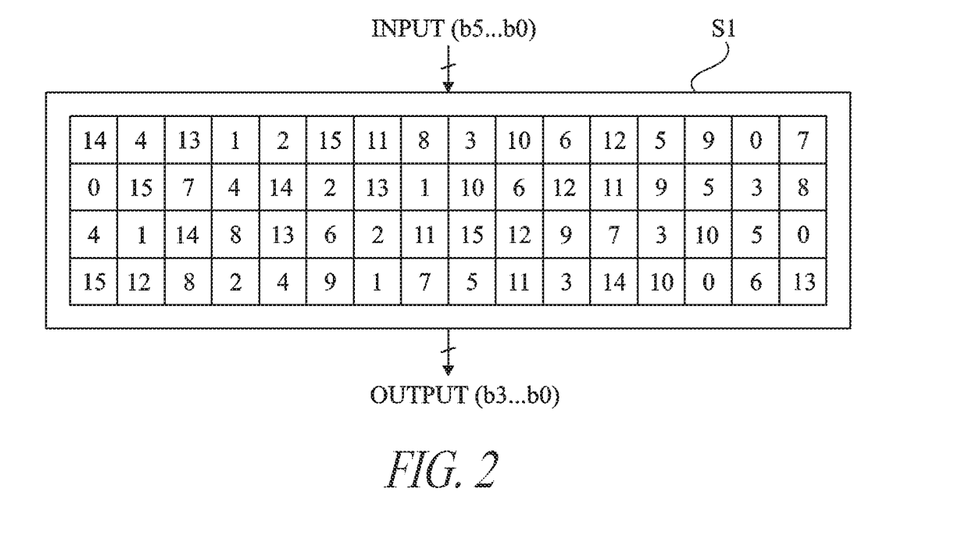
FIG. 2 schematically illustrates an S-box according to an example embodiment.

FIG. 2 schematically illustrates an example of an S-box used during the DES (data encryption standard) algorithm. As known to those skilled in the art, the DES encryption algorithm involves 8 S-boxes S1 to S8, each of which is unique. FIG. 2 illustrates the DES S-box S1.

An S-box access according to the DES encryption algorithm involves inputting 6 input bits (INPUT) b5 to b0, and outputting 4 output bits (OUTPUT) b3 to b0. The S-box S1 is in the form of a lookup table having 16 columns and 4 rows. The bits b5 and b0 of the input value are for example used to select a row of the table, and the bits b4 to b1 of the input value are for example used to select a column of the table. The 4-bit value stored in the selected row and column forms the output value of the S-box.

Of course FIG. 2 illustrates only one example of an S-box, and the principles described in the present disclosure could be applied to any type of S-box in which input data is substituted in order to generate output data based on a table of stored values.

Figure 3A:
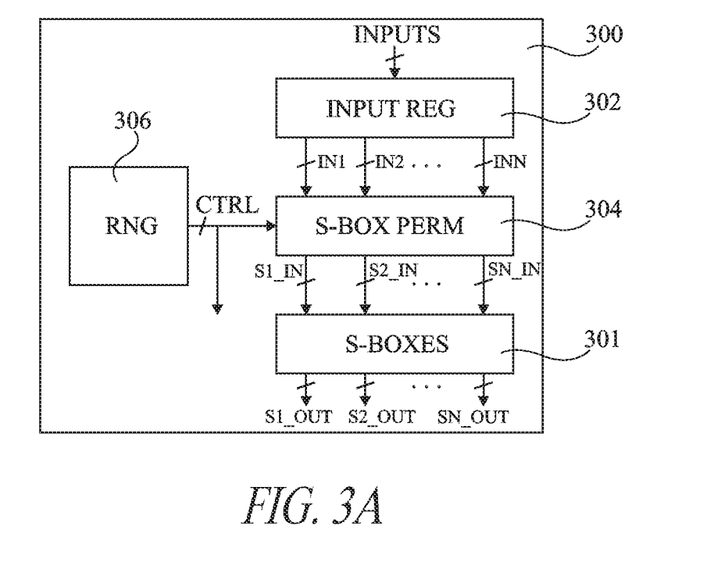
FIG. 3A schematically illustrates a substitution circuit according to an example embodiment of the present disclosure.

FIG. 3A schematically illustrates a substitution circuit 300 for implementing sets of S-box access operations according to an example embodiment of the present disclosure. The circuit 300 for example forms part of the circuit 100 of FIG. 1.

The circuit 300 for example comprises N S-boxes (S-BOXES) 301, which for example correspond to the eight S-boxes of the DES encryption standard. Alternatively, the N S-boxes could correspond to those used in another encryption standard such as in the TDES (triple DES) encryption standard.

Each of the N S-boxes receives a respective input data value S1_IN to SN_IN, and provides a respective output data value S1_OUT to SN_OUT. The S-boxes 301 are for example implemented by one or more non-volatile memories, the respective input data values S1_IN to SN_IN providing address inputs to the one or more memories, and the output data values S1_OUT to SN_OUT corresponding to the data values stored at the addressed memory locations.

The circuit 300 further comprises an input register (INPUT REG) 302 and an S-box permutation circuit (S-BOX PERM) 304. The input register 302 for example receiving N input values INPUTS corresponding to the inputs of a set of substitution operations to be performed in relation with a cryptographic algorithm by the N S-boxes 301. For example, the N input values INPUTS are the result of an operation performed on the message data and the key data of FIG. 1. The register 302 for example provides the N input values IN1 to INN to the S-box permutation circuit 304.

The S-box permutation circuit 304 for example selects the input value to be provided to each of the S-boxes during a given set of substitution operations. For example, the permutation circuit 304 receives a control signals CTRL from a random number generator (RNG) 306 for controlling the selection. The generator 306 is for example a pseudo-random number generator or a true random number generator.

In operation, each real set of S-box access operations defined by the cryptographic algorithm is implemented by a series of m sets of S-box access operations, where m is for example an integer equal to two or more. Only one of the m sets of S-box access operations corresponds to the real set of substitution operations of the cryptographic algorithm. The other m-1 sets of access operations of each series correspond to sets of fake or dummy substitution operations involving different permutations of the S-boxes by the circuit 304. For example, each dummy set of substitution operations for a given series of sets of substitution operations is based on a different permutation from the others.

Figure 3B:
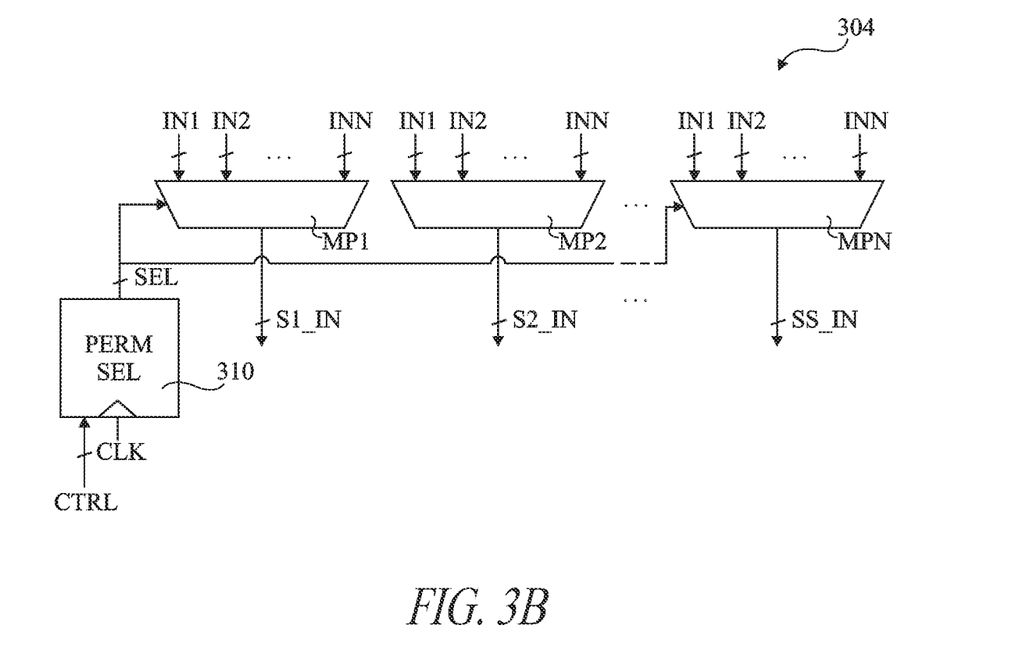
FIG. 3B schematically illustrates a permutation circuit of the substitution circuit of FIG. 3A in more detail according to an example embodiment of the present disclosure.

FIG. 3B schematically illustrates the S-box permutation circuit 304 of FIG. 3A in more detail according to an example embodiment. The circuit 304 for example comprises N multiplexers MP1 to MPN, one associated with each of the N S-boxes. Each of the multiplexers MP1 to MPN receives each of the input values IN1 to INN from the input register 302. Thus any input value can be provided to any S-box. Of course, in the case that only a limited number of permutations are available for selection, each multiplexer MP1 to MPN does not need to receive each input signal IN1 to INN.

The permutation circuit 304 also for example comprises a permutation selection circuit (PERM SEL) 310, which generates a selection signal SEL for controlling the multiplexers MP1 to MPN based on the value of the control signal CTRL provided by the random number generator 306. The permutation selection circuit 310 for example receives a clock signal CLK indicating the period of each set of S-box access operations such that the selection signal SEL can be updated at the appropriate time.

According to one embodiment that will now be described with reference to FIGS. 4 and 5, each set of substitution operations corresponds to all of the substitution operations performed during the execution of a cryptographic algorithm based on a given message and key.

Figure 4:
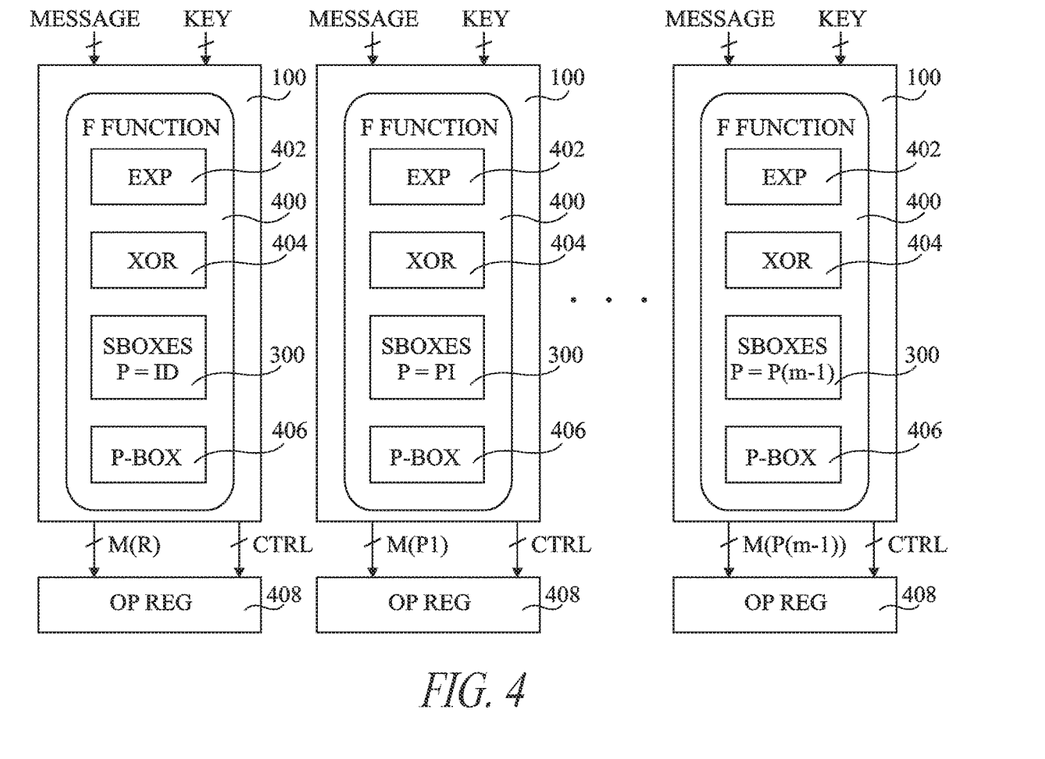
FIG. 4 schematically illustrates a circuit for executing a series of cryptographic operations according to an example embodiment of the present disclosure.

FIG. 4 illustrates the cryptographic circuit 100 of FIG. 1 in more detail for a series of m sets of substitution operations each corresponding to an execution of the DES algorithm based on a given message (MESSAGE) and key (KEY). The cryptographic circuit 100 for example comprises a circuit 400 (F FUNCTION) for executing a round function, each round for example comprising an expansion operation (EXP) performed by a circuit 402, an XOR operation (XOR) performed by a circuit 404 to introduce a round key, the substitution operation performed by the substitution circuit 300, and a permutation operation (P-BOX) performed by a circuit 406. The message resulting from each execution of the DES algorithm is provided to an output register (OP REG) 408, along with the control signal CTRL.

The cryptographic circuit 100 is illustrated multiple times in FIG. 4 to represent the substitution operation performed during each of the series of m executions of the DES algorithm. One of these executions shown on the left in FIG. 4 is based on no permutation of the S-boxes (S-BOXES P=ID), whereas the other executions are respectively based on permutations P1 to P(m-1). The order of the real and fake DES executions is selected randomly for each series of executions based on the randomly generated control signal CTRL.

Figure 5:
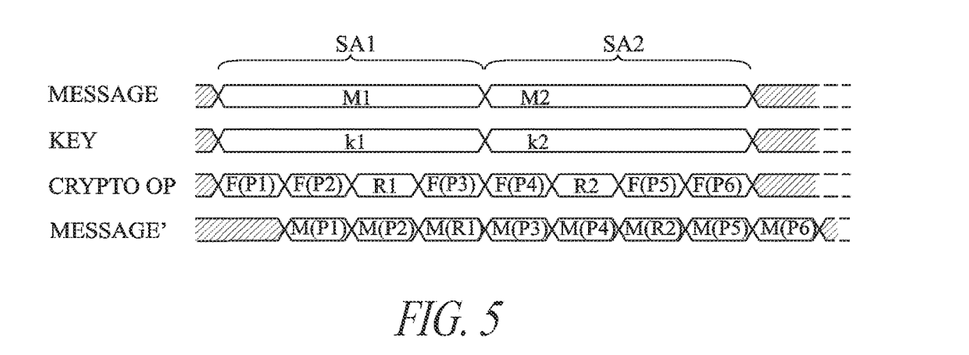
FIG. 5 is a timing diagram illustrating examples of signals in the circuit of FIG. 4 according to an example embodiment.

FIG. 5 is a timing diagram representing an example of the signals MESSAGE and KEY at the input of the circuit 100 of FIG. 4, of the operations performed by the circuit 100, and of the output message (MESSAGE') generated during each execution.

A first series SA1 of DES executions is based on a message M1 and on a key k1 and a second series SA2 of DES executions is based on a message M2 and on a key k2. In the example of FIG. 4, the number m of DES executions in each series is fixed at four, although in alternative embodiments m could be any integer equal to 2 or more. The series SA1 for example comprises three fake DES executions F(P1), F(P2) and F(P3) respectively based on permutations P1, P2 and P3 of the S-boxes, and a real DES execution R1. The series SA2 for example comprises three fake DES executions F(P4), F(P5) and F(P6) respectively based on permutations P4, P5 and P6 of the S-boxes, and a real DES execution R2. The position of the real DES execution among the fake executions is randomly selected for each series of m executions, and is the third position in the series SA1 and the second position in the series SA2 in the example of FIG. 5.

In some embodiments, the group of permutations in each series of sets of access operations is fixed for a given secret key, and only the position of the real set of access operations varies between the series. Each time the key changes, a new group of permutations is for example selected.

The message MESSAGE' resulting from each execution of the cryptographic algorithm is for example output following the termination of each execution of the cryptographic algorithm, and these messages are for example labelled M(P1) to M(P6) in the case of the fake executions F(P1) to F(P6), and M(R1) and M(R2) in the case of the real executions R1 and R2. During each series of executions, all of the messages are for example stored to the output register 408, and the control signal CTRL is for example used to select only the real messages from the output register 408 to provide the result of the cryptographic algorithm.

Figure 6A:
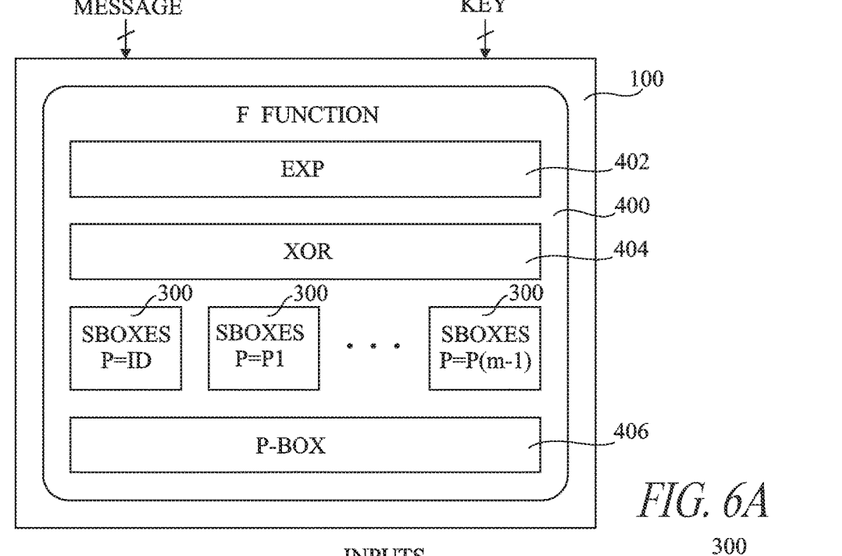
FIG. 6A schematically illustrates a circuit for executing a series of cryptographic operations according to a further example embodiment of the present disclosure.

FIG. 6A illustrates the cryptographic circuit 100 of FIG. 1 in more detail for a series of m sets of substitution operations each corresponding to a single substitution operation accessing a plurality of substitution tables. The example of FIG. 6A is again based on the DES algorithm, and involves the same circuit 400 of FIG. 4. However, in the case of FIG. 6A, each time the substitution circuit 104 is called to apply a set of substitution operations within a given execution of the round function, a series of m sets of substitution operations is performed.

The substitution circuit 300 is illustrated multiple times in FIG. 6A to represent the set of substitution operations performed during each of the series of m set of substitution operations. One of these sets of substitution operations is shown on the left in FIG. 6A is based on no permutation of the S-boxes (S-BOXES P=ID), whereas the other sets of substitution operations are respectively based on permutations P1 to P(m−1). The order of the real and fake sets of substitution operations is selected randomly for each series of substitution operations based on the randomly generated control signal CTRL.

Figure 6B:
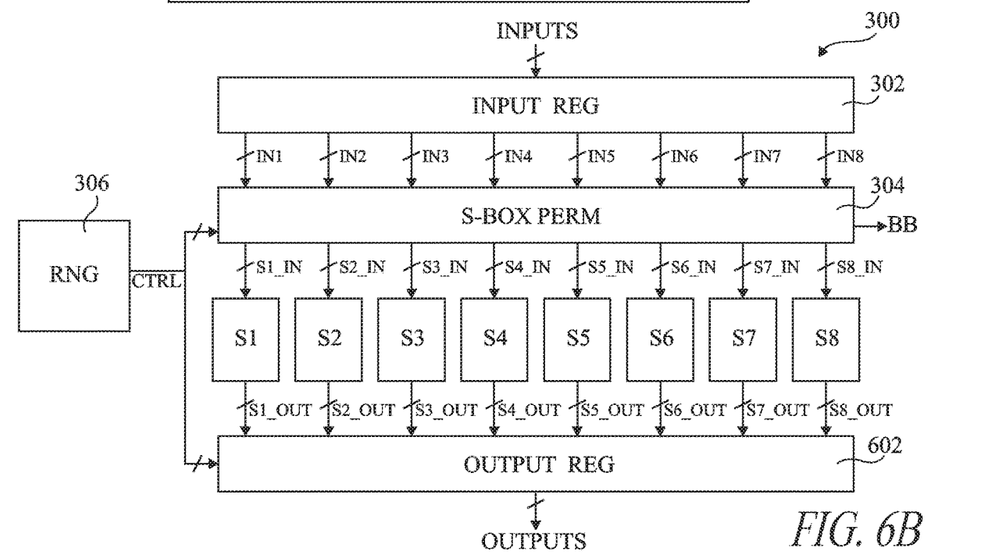
FIG. 6B schematically illustrates a substitution circuit of FIG. 6A in more detail according to an example embodiment of the present disclosure.

FIG. 6B illustrates the substitution circuit 300 in more detail according to an example embodiment. The circuit 300 of FIG. 6B is for example similar to that of FIG. 3A, and like features are labelled with like reference numerals and will not be described again in detail. The example of FIG. 6A is based on the eight S-boxes S1 to S8 of the DES standard. The S-box permutation circuit 304 for example generates a busy bit (BB) to indicate to a host system the periods during which the S-boxes are occupied. Furthermore, in the example of FIG. 6B, the outputs of the S-boxes are provided to an output register (OUTPUT REG) 602, which also for example receives the control signal CTRL from the generator 306.

In operation, during each set of substitution operations to be performed using the S-boxes S1 to S8, the input data values IN1 to IN8 are loaded into the input register 302, and the selection of the input value to be provided to each S-box during each of the m sets of S-box access operations of the series is based on the value of the control signal CTRL.

For example, in some embodiments, the control signal CTRL comprises random values PERM, RAC and NFC.

The value RAC for example comprises an r-bit value indicating the position of the real sets of substitution operations among the m−1 dummy sets of substitution operations. For example, $2^r$ is equal to m. In one example, m is equal to 4, and r is equal to 2, where a value RAC of "00" indicates the first of the four sets of substitution operations, and a value of RAC of "11" indicates the fourth of the four sets of substitution operations.

The permutations are for example selected randomly based on the random value PERM provided by the generator 306. In some embodiments, the permutations are selected randomly for each of the m−1 dummy sets of access operations in each series. In alternative embodiments, for a given key value k, the particular permutations applied during each of the m−1 sets of dummy access operations are fixed until the key is changed.

The number of possible permutations of the eight S-boxes S1 to S8 in the example of FIG. 6B is equal to 8-factorial, also expressed as 8!, which is equal 40320. Furthermore, each of the m−1 sets of dummy substitution operations of a given series of sets of substitution operations uses a different permutation. Therefore, for a given series of sets of substitution operations, the S-box permutation circuit 304 for example selects both the permutations to be applied, and the order that the permutations are to be applied.

In some embodiments, the permutation circuit 304 is capable of applying a limited group of permutations in a limited number of different orders for the m−1 sets of dummy substitution operations, and the value of PERM is used to randomly select both the permutations and the order of the permutations. An example of the permutation selection based on a 3-bit value of PERM, on a value of m equal to 4, and based on eight available permutations P1 to P8, is provided in the following table for the m−1 sets of dummy substitution operations:

| Value of PERM | Selected permutations and order |
| --- | --- |
| "000" | P1, P2, P3 |
| "001" | P4, P5, P6, |
| "010" | P7, P8, P2 |
| "011" | P4, P6, P8 |
| "100" | P3, P6, P1 |
| "101" | P5, P7, P2 |
| "110" | P8, P5, P1 |
| "111" | P7, P4, P6 |

Furthermore, the value of RAC is used to select the position of the real set of substitution operations with respect to the m−1 dummy sets of substitution operations. Thus, if PERM is equal to "000" and RAC is equal to "11", the m sets of substitutions are for example performed as follows based on the tables above: P1, P2, P3, RA, where RA corresponds to the real set of S-box access operations.

The value NFC for example indicates the number m−1 of dummy sets of substitution operations in each series. In some embodiments, this value may be fixed for a given key, while in other embodiments, this value is randomly generated for each series of sets of substitution operations.

For example, in one embodiment, the value NFC is a 2-bit value, and the value RAC is a 3-bit value. The number m−1 of dummy S-box accesses in each series of S-box accesses is for example equal to:

$$m-1 = 2^{NFC} - 1$$

Thus, with the value of NFC being equal to 0, 1, 2 or 3, the number m−1 of dummy S-box accesses can for example be 0, 1, 3 or 7. Furthermore, the value RAC is for example used to determine the position of the real access by performing a logic AND operation between the 3-bit binary value RAC and a 3-bit binary value FN representing the number m−1.

By randomly generating the value of NFC for each series of S-box accesses, the processing time for each real S-box access will be variable. Thus, as the duration of each S-box access is no longer predictable, the busy bit BB for example indicates to the host processing system the time periods during which the S-boxes 301 is occupied.

The output register 602 for example stores each of the output values S1_OUT to S8_OUT from the S-boxes S1 to S8 during each of the sets of substitution operations of each series. Furthermore, the circuit 602 for example selects the real set of output values to form the output values OUTPUTS based on the value RAC.

Operation of the circuit of FIG. 6B will now be described in more detail with reference to FIG. 7.

Figure 7:
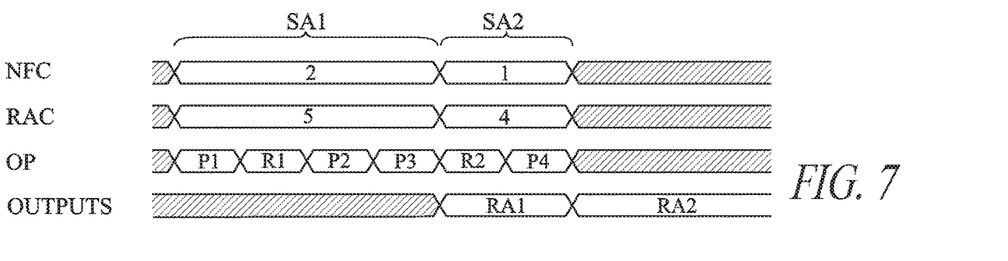
FIG. 7 is a timing diagram illustrating an example of signals in the circuit of FIG. 6B.

FIG. 7 is a timing diagram representing examples of the value NFC, the value RAC, the S-box access operations OP, and the output values OUTPUTS, during a series of sets of accesses SA1 and SA2 using the circuit of FIG. 6B.

During the series of sets of accesses SA1, the values of NFC and RAC are randomly generated to equal 2 and 5 respectively. Thus, based on the above equation, the number m−1 of dummy sets of S-box operations in the series SA1 is equal to 3. The total number of sets of S-box accesses in any series is equal to m, and the result of the operation NF*RAC is for example a 3-bit value that may assume a value between 0 and NF, where 0 represents the first access of the series, and NF represents the last access of the series. Thus, in the example of the series of accesses SA1, the position of the real access operation is equal to a logic AND applied bit by bit to the values "011" and "101", which gives "001", corresponding to the second access of the series. Thus, in the example of the series of accesses SA1, the position of the real set of access operations is second, and the series SA1 of m sets of access operations comprises, in sequence: a dummy set of access operations using a random permutation P1; a real set of access operations R1; a dummy set of access operations using a random permutation P2; and a dummy set of access operations using a random permutation P3. After the last set of access operations, the output values OUTPUTS become equal to the result of the real set of access operations RA1.

During the series of accesses SA2, the values of NFC and RAC are randomly generated to equal 1 and 4 respectively. Thus the number m−1 of dummy sets of S-box operations in the series SA2 is equal to 1, and the position of the real access operation in the series SA2 is equal to a logic AND applied bit by bit to the values "001" and "100", which gives "000", corresponding to the first access of the series. Thus, in the example of the series of sets of accesses SA2, the m sets of access operations comprise, in sequence: a real set of access operations R2; and a dummy set of access operations using a random permutation P4. After the last set of access operations, the output values OUTPUTS becomes equal to the result of the real set of access operations RA2.

The examples of FIGS. 3A, 4 and 6A correspond to hardware implementations. In alternative embodiments, the method of performing a set of S-box access operations described herein could be implemented in software, as will now be described in more detail with reference to FIGS. 8 and 9.

Figure 8:
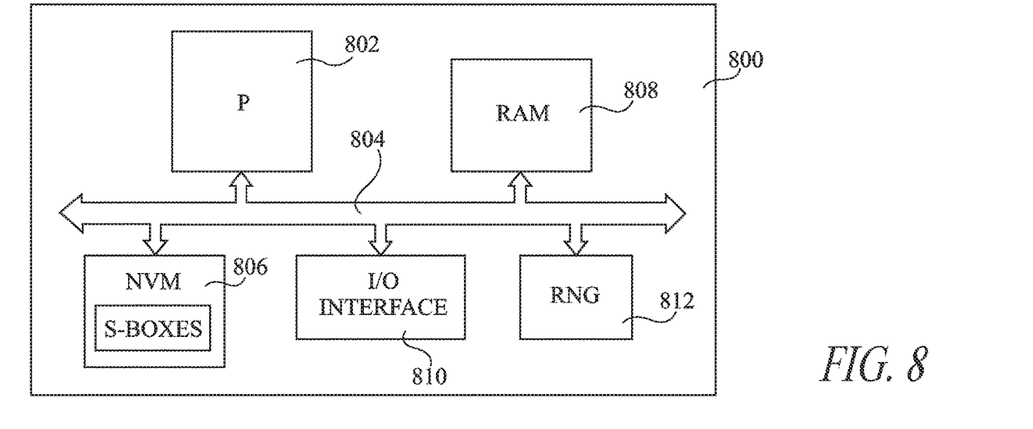
FIG. 8 schematically illustrates a processing system for performing sets of S-box access operations according to an example embodiment of the present disclosure.

FIG. 8 schematically illustrates a processing system 800 according to an example embodiment of the present disclosure. The system 800 for example comprises a processing device (P) 802 coupled via a bus 804 to a memory 806 storing a plurality of S-boxes (S-BOXES). The memory 806 is for example a non-volatile memory (NVM). The system 800 also for example comprises, coupled to the bus 804, a volatile memory 808, which is for example a RAM (random access memory), an input/output interface (I/O INTERFACE) 810, and a random number generator (RNG) 812. The processing device 802 for example comprises one or more processing cores or circuitry under control of instructions stored in an instruction memory, for example the memory 806 and/or 808.

Figure 9:
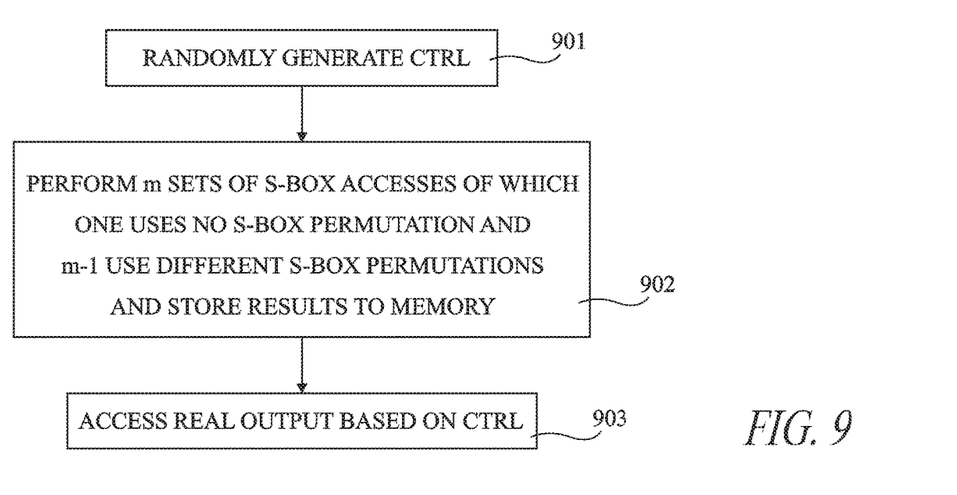
FIG. 9 is a flow diagram representing operations in a method of performing sets of S-box access operations according to an example embodiment of the present disclosure.

FIG. 9 is a flow diagram illustrating operations in a method of performing a set of S-box access operations according to an example embodiment of the present disclosure, and using the processing system of FIG. 8. As described above, each set of S-box access operations may correspond to only the substitution operation itself, or to the substitution operation performed during an entire cryptographic algorithm.

In an operation 901, the random value CTRL is generated, for example based on random values provided by the generator 812. These values are for example stored in the RAM 808.

In an operation 902, the processing device 802 performs m sets of S-box accesses. Each set of S-box accesses for example involves loading N input values into the working memory of the processing device 802, which for example corresponds to the memory 808. One of these sets corresponds to a real set based on S-box accesses as defined by the cryptographic algorithm being executed, without permutation. The remaining m−1 sets of S-box accesses correspond to sets of dummy access operations, in which a permutation is applied by the processing device 802, based on the value CTRL, such that during these S-box accesses, each of the N input values is not provided to its corresponding S-box, but to another S-box based on a random selection. The real set of accesses is randomly positioned with respect to the dummy sets of accesses based on the value CTRL. Each set of S-box accesses is for example performed by addressing one or more non-volatile memories, such as the memory 806, which for example stores a lookup table corresponding to each S-box. The result of each set of S-box accesses is stored to memory, such as to the RAM 808.

While in the hardware implementation of FIG. 6B the S-box accesses of each set are for example performed in parallel in each of the S-boxes S1 to S8, in the case of the software implementation of FIG. 8, the S-box accesses of each set may be performed in parallel if processing resources permit, or may be performed in series.

In operation 904, the results of the real set of S-box accesses are selected to be used in the cryptographic algorithm, based on the signal CTRL. For example, the processing device 802 selects in the RAM 808, based on the values of the random values RAC and NFC of the control signal CTRL, an address corresponding to the storage location of the results of the real set of substitution operations.

Figure 10:
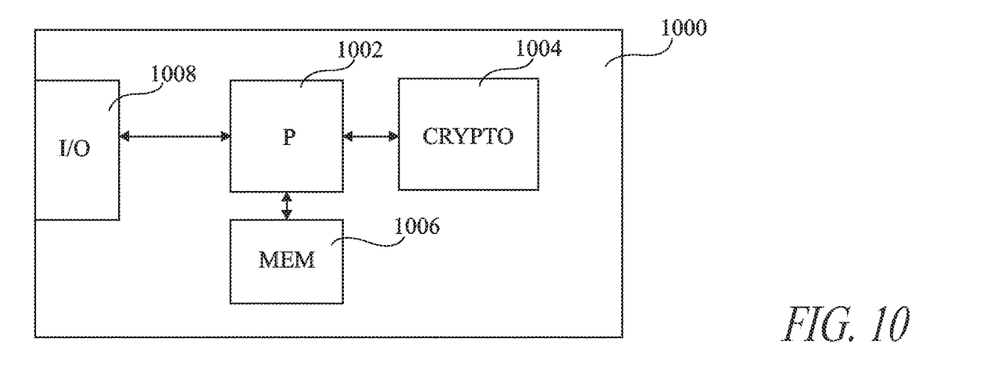
FIG. 10 schematically illustrates a cryptographic device according to an example embodiment of the present disclosure.

FIG. 10 schematically illustrates a cryptographic device 1000 according to an example embodiment.

The device 1000 for example comprises a processing device (P) 1002 corresponding to the host processor of the cryptographic device 1000. The processing device 1002 is for example in communication with a cryptographic circuit 1004, which for example corresponds to the circuit 300 of FIG. 3A, 4 or 6A, or to some or all of the components of the processing system 800 of FIG. 8. The cryptographic device 1000 also for example comprises a memory (MEM) 1006 and an input/output interface (I/O) 1008 in communication with processing device 1002.

The device 1000 for example corresponds to an integrated circuit card (often known as a "smart card"), portable electronics device or other type of electronics device in which a cryptographic function is to be realized. In some embodiments, the input/output interface 1008 may correspond to an NFC (near-field communication) interface.

An advantage of the embodiments described herein is that the discovery of a secret key manipulated during sets of substitution operations of a cryptographic algorithm using side channel methods may be rendered considerably more difficult. Indeed, by performing dummy sets of S-box accesses based on permutations of the S-boxes, this creates a dissymmetry of the leakages during each real set of S-box accesses, and it becomes very difficult for a meaningful correlation to be determined between side channel signals during the S-box accesses and the value of the secret key.

Furthermore, by using a same group of permutations for a given secret key, this can lead to the generation of misleading information regarding the key value on the side channels. Indeed, a given permutation repeated several times for a same key can be mistaken for genuine S-box accesses performed based on a different ghost key. With several different permutations, the number of different ghost keys that will appear to have good correlations can be relatively high, and significantly higher than in the case that a fake key and/or fake message is used.

An advantage of the hardware implementations of FIGS. 3A, 3B, 4, 6A and 6B is that switching between dummy and real sets of S-box accesses can be performed relatively rapidly, leading to a relatively small time overhead for the additional sets of S-box accesses.

Having thus described at least one illustrative embodiment, various alterations, modifications and improvements will readily occur to those skilled in the art. For example, it will be apparent to those skilled in the art that the circuit of FIG. 3B implementing the S-box permutation circuit is merely one example, and that many alternative implementations would be possible.

Furthermore, while embodiments have been described in which each permutation is applied at the level of a single substitution operation, or at the level of an entire cryptographic algorithm, the permutation could also be applied at different levels. For example, each permutation could be applied for an entire round of the DES encryption algorithm, and a series of fake rounds could be performed for each real round to be executed.

Furthermore, it will be apparent to those skilled in the art that the various features described in relation with the embodiments could be combined, in alternative embodiments, in any combination. For example, it would be possible to implement the S-box access method of the present disclosure using a combination of hardware and software.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
executing, using a cryptographic circuit, a cryptographic process including a plurality of substitution operations; and
protecting the cryptographic circuit during execution of the cryptographic process, the executing and protecting including, performing, for each of the plurality of substitution operations of the cryptographic process, a series of m sets of substitution operations of which:
one set of the series corresponds to the plurality of substitution operations of the cryptographic process, and is performed using a plurality of substitution tables; and
m−1 sets of the series are dummy sets of substitution operations, each dummy set being performed using a different permutation of the plurality of substitution tables, wherein, for a given key, a same group of m−1 permutations are applied during the corresponding m−1 dummy substitution operations.

2. The method of claim 1, wherein a position of the set of substitution operations corresponding to the plurality of substitution operations of the cryptographic process in each of the series of sets of substitution operations is selected randomly based on a first random value.

3. The method of claim 2, wherein performing each series of sets of substitution operations comprises:

loading N input values, where N is an integer equal to or greater than two; and supplying, on consecutive sets of S-box access operations, each of said N input values to a respective one of N S-boxes, wherein during the set of substitution operations corresponding to the plurality of substitution operations of the cryptographic process, each of the N input values is supplied to a corresponding one of said N S-boxes based on said cryptographic process, and during the dummy sets of substitution operations each of the N input values is supplied to a different S-box than its corresponding S-box, and wherein the position that the set of substitution operations corresponding to the plurality of substitution operations of the cryptographic process is performed with respect to the dummy sets of substitution operations is selected based on the first random value.

4. The method of claim 2, wherein each set of substitution operations comprises addressing memory locations of one or more memories based on S-box input data values and reading values at said memory locations to provide S-box output data values.

5. The method of claim 4, comprising, for each series of sets of substitution operations, storing the S-box output values of each substitution operation, and selecting the output values corresponding to the set of substitution operations corresponding to the plurality of substitution operations of the cryptographic process based on said first random value.

6. The method of claim 1, wherein performing each set of substitution operations in said series comprises using a same input message and secret key.

7. The method of claim 6, wherein:
m is an integer fixed at a value equal to or greater than 2 or selected randomly.

8. The method of claim 7, wherein each group of m−1 permutations for a given key is selected based on a second random value.

9. The method of claim 1, wherein a number of dummy sets of substitution operations performed in each series is selected randomly.

10. A non-transitory computer-readable medium storing a computer program which, when executed by a processing device, implements a method, the method comprising:
executing, using a cryptographic circuit, a cryptographic process including a plurality of substitution operations; and
protecting the cryptographic circuit during execution of the cryptographic process, the executing and protecting including, performing, for each of the plurality of substitution operations of the cryptographic process, a series of m sets of substitution operations of which:
one set of the series corresponds to the plurality of substitution operations of the cryptographic process, and is performed using a plurality of substitution tables; and
m−1 sets of the series are dummy sets of substitution operations, each dummy set being performed using a different permutation of the plurality of substitution tables, wherein, for a given key, a same group of m−1 permutations are applied during the corresponding m−1 dummy substitution operations.

11. The non-transitory computer readable medium of claim 10 wherein a position of the set of substitution operations corresponding to the plurality of substitution operations of the cryptographic process in each of the series of sets of substitution operations is selected randomly based on a first random value.

12. The non-transitory computer readable medium of claim 11 wherein performing each series of sets of substitution operations comprises:
loading N input values, where N is an integer equal to or greater than two; and
supplying, on consecutive sets of S-box access operations, each of said N input values to a respective one of N S-boxes, wherein during the set of substitution operations corresponding to the plurality of substitution operations of the cryptographic process, each of the N input values is supplied to a corresponding one of said N S-boxes based on said cryptographic process, and during the dummy sets of substitution operations each of the N input values is supplied to a different S-box than its corresponding S-box, and wherein the position that the set of substitution operations corresponding to the plurality of substitution operations of the cryptographic process is performed with respect to the dummy sets of substitution operations is selected based on the first random value.

13. The non-transitory computer readable medium of claim 10 wherein:
m is an integer fixed at a value equal to or greater than 2 or selected randomly.

14. The non-transitory computer readable medium of claim 13, wherein each group of m−1 permutations for a given key is selected based on a second random value.

15. The non-transitory computer readable medium of claim 10 wherein a number of dummy sets of substitution operations performed in each series is selected randomly.

16. A cryptographic device, comprising:
a memory circuit, which, in operation, stores a plurality of substitution tables to implement a plurality of substitution operations of a cryptographic process; and
cryptographic circuitry coupled to the memory circuit, wherein the cryptographic circuitry, in operation,
executes the cryptographic process; and
protects the cryptographic circuitry during execution of the cryptographic process, the executing and protecting including, for each of the plurality of substitution operations of the cryptographic process, performing a series of m sets of substitution operations using said substitution tables, each series of m sets of substitution operations comprising:
a set of substitution operations corresponding to the plurality of substitution operations of the cryptographic process; and
m−1 dummy sets of substitution operations, wherein a different permutation of said substitution tables is applied during each of said dummy sets of substitution operations, and, for a given key, a same group of m−1 permutations are applied during the corresponding m−1 dummy substitution operations.

17. The cryptographic device of claim 16, comprising a random number generator, which, in operation, generates, for each of said series of sets of substitution operations, a first random value, wherein the cryptographic circuitry randomly selects a position of the set of substitution operations corresponding to the plurality of substitution operations of the cryptographic process among the m−1 dummy sets of substitution operations based on the first random value.

18. The cryptographic device of claim 17, wherein the random number generator, in operation, generates a second random value, wherein the cryptographic circuitry randomly selects the permutations of said substitution tables based on the second random value.

19. The cryptographic device of claim 18, comprising:
an input register configured to store N input values; and
one or more multiplexers configured to select, for each set of substitution operations of each series, the input value among said N input values to be provided to each substitution table.

20. The cryptographic device of claim 19, comprising a selection circuit configured to generate a selection signal for controlling the one or multiplexers based on said first and second random values.

21. The cryptographic device of claim 16, wherein the cryptographic circuitry comprises one or more processing devices under control of instructions stored in an instruction memory to load N input values into a memory, where N is equal to the number of substitution tables, and to select, for each set of substitution operations of each series, either to implement the set of substitution operations corresponding to the plurality of substitution operations of the cryptographic process by providing each input value to a corresponding one of said substitution tables based on said cryptographic process, or to implement a dummy set of substitution operations by providing each input value to one of said substitution tables other than the corresponding one.

22. A system, comprising:
one or more processing cores; and
cryptographic circuitry coupled to the one or more processing cores, wherein the cryptographic circuitry, in operation, executes a cryptographic process and protects the cryptographic circuitry during execution of the cryptographic process, the executing and protecting including:
performing, for each set of substitution operations of the cryptographic process, a series of sets of substitution operations of which:
one set of the series is a real set of substitution operations corresponding to the set of substitution operations of the cryptographic process, and is performed using a plurality of substitution tables; and
m−1 other sets of the series are dummy sets of substitution operations, each dummy set being performed using a different permutation of the plurality of substitution tables, wherein for a given key, a same group of m−1 permutations are applied during the corresponding m−1 dummy substitution operations.

23. The system of claim 22, wherein a position of the real set of substitution operations in each series is selected randomly based on a first random value.

24. The system of claim 22, wherein the cryptographic process is related to a function of the one or more processing cores.

* * * * *

UNITED STATES PATENT AND TRADEMARK OFFICE
CERTIFICATE OF CORRECTION

PATENT NO. : 11,265,145 B2  
APPLICATION NO. : 16/281881  
DATED : March 1, 2022  
INVENTOR(S) : Yanis Linge et al.

Page 1 of 1

It is certified that error appears in the above-identified patent and that said Letters Patent is hereby corrected as shown below:

In the Claims

Column 17, Claim 20, Line 12:
"one or multiplexers" should read: -- one or more multiplexers --.

Signed and Sealed this
Fifth Day of July, 2022

Katherine Kelly Vidal
*Director of the United States Patent and Trademark Office*